(12) United States Patent
Shirakura et al.

(10) Patent No.: US 8,526,087 B2
(45) Date of Patent: Sep. 3, 2013

(54) HOLOGRAM RECORDING MEDIUM

(75) Inventors: Akira Shirakura, Tokyo (JP); Nobuhiro Kihara, Kanagawa (JP)

(73) Assignees: Sony Corporation, Tokyo (JP); Sony Disc & Digital Solutions Inc., Tokyo (JP)

( * ) Notice: Subject to any disclaimer, the term of this patent is extended or adjusted under 35 U.S.C. 154(b) by 756 days.

(21) Appl. No.: 12/701,242

(22) Filed: Feb. 5, 2010

(65) Prior Publication Data

US 2010/0208314 A1   Aug. 19, 2010

(30) Foreign Application Priority Data

Feb. 18, 2009   (JP) .................................. 2009-035047
Nov. 25, 2009   (JP) .................................. 2009-267209

(51) Int. Cl.
*G03H 1/02*   (2006.01)

(52) U.S. Cl.
CPC ....................................... *G03H 1/02* (2013.01)
USPC .......................................... 359/3; 359/489.01

(58) Field of Classification Search
None
See application file for complete search history.

(56) References Cited

U.S. PATENT DOCUMENTS

2002/0018253 A1   2/2002   Toshine et al.
2009/0104539 A1   4/2009   Watanabe et al.

FOREIGN PATENT DOCUMENTS

| JP | 2002-082593 | 3/2002 |
|---|---|---|
| JP | 3342056 | 8/2002 |
| JP | 2007-102202 | 4/2007 |
| WO | WO 2007029693 A1 * | 3/2007 |

* cited by examiner

*Primary Examiner* — Derek S Chapel
(74) *Attorney, Agent, or Firm* — Dentons US LLP

(57) ABSTRACT

Disclosed herein is a hologram recording medium, wherein in a volume hologram, the hologram recording medium is covered with a partially patterned optical functional film on the side closer to the viewer than a hologram recording layer without the medium of air, and wherein the hologram recording medium maintains its appearance approximately unchanged irrespective of the presence or absence of the optical functional film.

11 Claims, 6 Drawing Sheets

HOLOGRAM RECORDING MEDIUM

BACKGROUND OF THE INVENTION

1. Field of the Invention

The present invention relates to a hologram recording medium for providing improved security of holograms used for authentication purposes.

2. Description of the Related Art

Three-dimensionally displayable holograms are used to ensure that CD cards, prepaid cards, passes, bank account books, passports, identification papers, merchandise and others are legitimate and not falsified. At present, it is widely common to affix, for example, a label or sticker to the target. The label or sticker includes an embossed hologram. In the embossed hologram, interference fringes are recorded as projections and depressions on the surface. However, embossed holograms are easy to counterfeit. In contrast, Lippmann holograms, in which interference fringes are recorded as a difference in refractive index within the film, are extremely difficult to counterfeit. One of the reasons for this is that advanced techniques are desired to produce a recorded image. Another reason is that recording media are difficult to procure.

There are two production methods for a volume hologram (also referred to as a Lippmann hologram), namely, real image hologram and holographic stereogram. To prepare a real image hologram, a laser is irradiated onto the subject. In contrast, a holographic stereogram is recorded based on parallax images from a number of viewpoints. The production process of a volume holographic stereogram includes three steps, i.e., a content production step which includes image acquisition and editing and other processing of the acquired images, a hologram master preparation step and a copying (mass production) step. The images are acquired by image capture or computer graphics. Each of a plurality of images acquired in the image editing step is converted to a strip-shaped image, for example, by a cylindrical lens. The master is prepared by sequential recording of interference fringes between the image object beam and the reference beam as strip-shaped elementary holograms to the hologram recording medium. The hologram is reproduced by contact printing using the master. That is, the hologram recording medium is brought into intimate contact with the master, followed by irradiation of a laser beam for reproduction of the hologram. As a result, the hologram is copied.

In this hologram, image information acquired by sequential shooting from different viewing points in the horizontal direction is sequentially recorded in the horizontal direction as strip-shaped elementary holograms. When the viewer looks at this hologram with both of his or her eyes, the two-dimensional images seen by the left and right eyes are slightly different. As a result, the viewer perceives parallax, thus reproducing the three-dimensional image.

As described above, in order to sequentially record strip-shaped elementary holograms, an HPO (Horizontal Parallax Only) holographic stereogram is produced which has parallax only in the horizontal direction. An HPO holographic stereogram desires only a short printing time and yet provides high image quality in recording. Further, vertical parallax can be created depending on the recording format. A hologram having parallax in the horizontal and vertical directions is referred to as an FP (Full Parallax) hologram.

A volume hologram sticker has been proposed (refer to Japanese Patent Laid-Open No. 2002-82593 (hereinafter referred to as Patent Document 1)). This sticker is designed to be affixed to an identification paper and may not be reused if peeled off. The reason for this is that the hologram layer is damaged because the peeling strength of the hologram layer is greater than the breaking strength thereof. In Japanese Patent No. 3342056, on the other hand, a hologram has been proposed in which a polarization control layer is provided. However, the polarization control layer itself is not patterned. Therefore, this hologram has been effective in aggravating the overall efficiency for copying the image, but failed to be significantly effective to such an extent that the latent image becomes apparent.

SUMMARY OF THE INVENTION

As described above, a volume hologram can be copied by bringing an unexposed hologram recording material into intimate contact with the hologram, followed by irradiation of a laser having a wavelength close to the recording wavelength. Hologram recording materials are difficult to manufacture and procure. As a result, it is not easy to produce an illegal copy. In order to provide added security, however, measures are desired which make it difficult to produce illegal copies or which makes copies distinguishable from the original.

The method described in Patent Document 1 is designed to prevent the hologram sticker from being replaced with an illegal one. However, this method is unable to prevent counterfeiting of the hologram by contact printing using the hologram master.

Authentication techniques include not only easily identifiable technical elements called "overt" techniques but also other technical elements called "covert" techniques which are difficult to identify unless, for example, tools are used. In the case of a hologram recording medium, it is preferred that information added for authentication purposes be invisible during the viewing of a recorded hologram because such information, if visible, can hinder the viewing of the hologram.

In light of the foregoing, it is an aim of the present invention to provide a hologram recording medium for preventing falsification by copying and providing covert elements for authentication.

In order to solve the above problem, according to the embodiment of the present invention, there is provided a hologram recording medium. In a volume hologram, the hologram recording medium is covered with an optical functional film on the side closer to the viewer than a hologram recording layer without the medium of air. The optical functional film is partially patterned. The hologram recording medium maintains its appearance approximately unchanged irrespective of the presence or absence of the optical functional film.

The optical functional film is an optically anisotropic film.

Further, the optically anisotropic film is partially hollowed out.

An isotropic material approximately identical in appearance to the film is filled into the hollowed-out portion.

The optical functional film is an optically isotropic film.

Further, the optically isotropic film is partially hollowed out.

An anisotropic material approximately identical in appearance to the film is filled into the hollowed-out portion.

Alternatively, the optical functional film is formed so that the direction of the optical axis thereof is partially different.

The optical functional film is a phase difference film.

The optical functional film is a polarizing film.

The optical functional film has a microstructure formed by nano-imprinting.

The optical functional film has a microstructure patterned by nano-imprinting.

The adhesion force between the optical functional film and hologram recording layer is greater than the self-binding force of the hologram recording layer.

In the embodiment of the present invention, the hologram recording medium is covered with an optical functional film on the side closer to the viewer than a hologram recording layer. The optical functional film is partially patterned. As a result, if the hologram is copied, a pattern will appear on the hologram recording medium following the copying. The copied hologram is different from the original one, thus preventing counterfeiting. Further, when the hologram is yet to be copied, the pattern thereof is not visually perceivable. Still further, if an attempt is made to peel off the optical functional film, the hologram recording layer is damaged before the optical functional film peels off, thus preventing the loss of the anti-copying effect.

DETAILED DESCRIPTION OF THE PREFERRED EMBODIMENT

A description will be given below of a mode for carrying out the present invention (hereinafter referred to as an embodiment). It should be noted that the description will be given in the following order:
1. Preparation of a hologram master
2. Embodiment
3. Modification example It should be noted that the embodiment described below is a preferred specific example of the present invention and includes various limitations which are technically preferable. However, the scope of the present invention is not limited to the embodiment as long as the following description does not include a particular description for limiting the present invention.

<1. Preparation of a Hologram Master>
"Holographic Stereogram Production System"

A description will be given first of a device adapted to produce a holographic stereogram having parallax information in the horizontal direction as a result of recording of a plurality of strip-shaped elementary holograms to a single recording medium. It should be noted that the embodiment of the present invention is applicable to a real image hologram which is prepared by irradiating a laser onto the subject as well as to a holographic stereogram.

Figure 1:
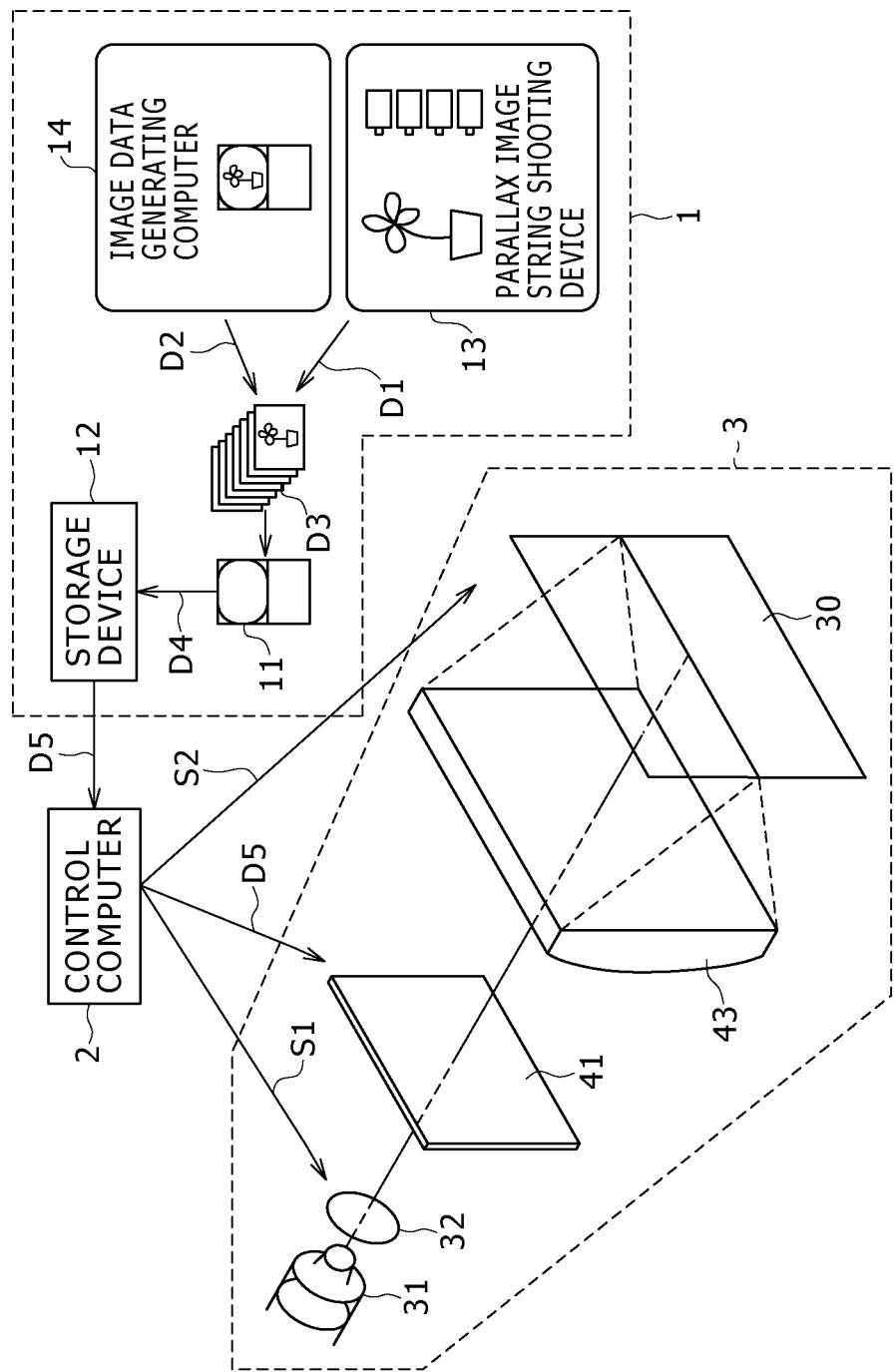
FIG. 1 is an outlined diagram illustrating a configuration example of a holographic stereogram production system to which the embodiment of the present invention is applicable.
Figure 2:
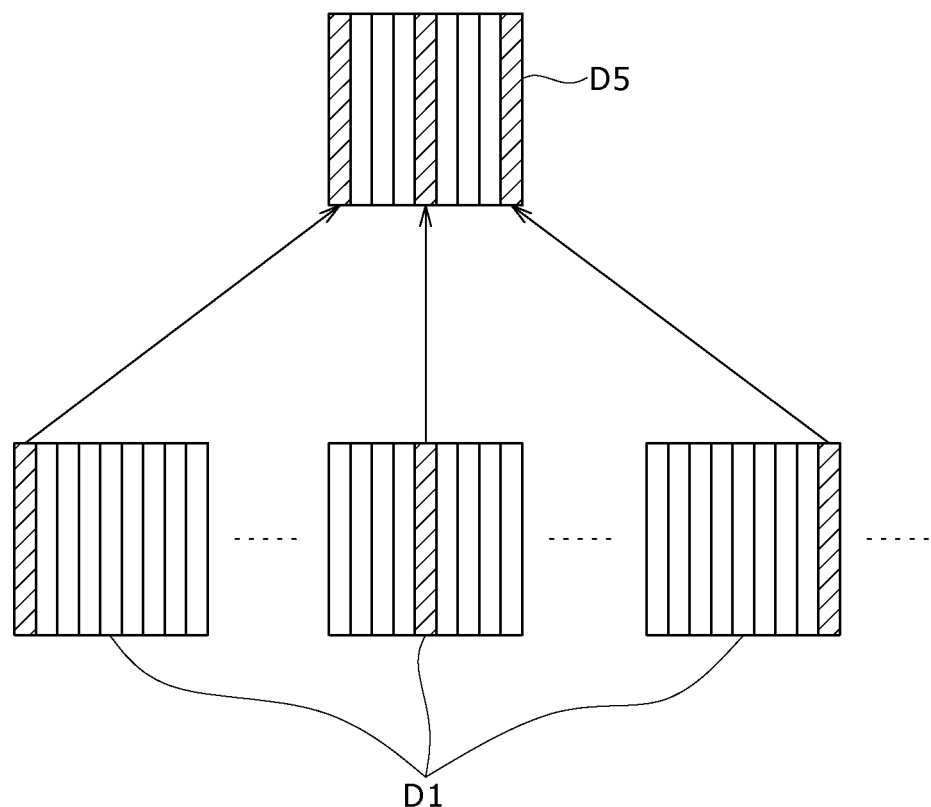
FIG. 2 is an outlined diagram used to describe an example of image processing during the production of a holographic stereogram.

This holographic stereogram production system is designed to prepare a so-called one-step holographic stereogram. With a one-step holographic stereogram, the hologram recording medium having the interference fringes between the object beam and reference beam recorded therein is used, as-is, as a holographic stereogram. As illustrated in FIG. 1, the holographic stereogram production system includes a data processing section 1, control computer 2 and holographic stereogram printer 3. The data processing section 1 processes image data to be recorded. The control computer 2 controls the system as a whole. The holographic stereogram printer 3 has an optical system adapted to produce a holographic stereogram.

The data processing section 1 generates a parallax image string D3 based on a plurality of pieces of image data D1. The plurality of pieces of image data D1 contain parallax information supplied from a parallax image string shooting device 13. The same device 13 has, for example, a multi-lens camera or mobile camera. The data processing section 1 generates the parallax image string D3 based on other data. Such data includes a plurality of pieces of image data D2 containing parallax information generated by an image data generating computer 14.

Here, the plurality of pieces of image data D1 containing parallax information supplied from the parallax image string shooting device 13 are image data for a plurality of images. Such image data is obtained by shooting an actual object from a plurality of different viewing points in the horizontal direction through simultaneous shooting with a multi-lens camera or continuous shooting with a mobile camera.

On the other hand, the image data generating computer 14 generates the plurality of pieces of image data D2 containing parallax information. For example, the image data D2 is a plurality of CAD (Computer Aided Design) images, CG (Computer Graphics) images or other image data created by sequentially providing parallax in the horizontal direction.

The data processing section 1 subjects the parallax image string D3 to predetermined image processing for holographic stereogram using an image processing computer 11. Image data D4 resulting from the predetermined image processing is stored in a storage device 12 such as memory or hard disk.

Further, during the recording of images to a hologram recording medium, the data processing section 1 reads one image at a time from the image data D4 stored in the storage device 12 and transmits this image data D5 to the control computer 2.

On the other hand, the control computer 2 drives the holographic stereogram printer 3. The images based on the image data D5 supplied from the data processing section 1 are sequentially recorded to a hologram recording medium 30, installed in the holographic stereogram printer 3, as strip-shaped elementary holograms.

At this time, the control computer 2 controls a shutter 32, display device 41, recording medium feed mechanism and other components incorporated in the holographic stereogram printer 3. That is, the control computer 2 transmits a control signal S1 to the shutter 32 to control its opening and closing. Further, the same computer 2 supplies the image data D5 to the display device 41 to cause the same device 41 to display the images based on the image data D5. Still further, the same computer 2 transmits a control signal S2 to the recording medium feed mechanism to control the feed motion of the hologram recording medium 30 by the same mechanism.

Image processing includes dividing each of the plurality of pieces of image data D1 containing parallax information in the direction of parallax, i.e., in the horizontal direction (along the width) into slits, and assembling the slices, generated by the division, into the processed image D5. This image D5 is displayed on the display device 41.

"Example of Hologram Recording Medium"

Figure 3:
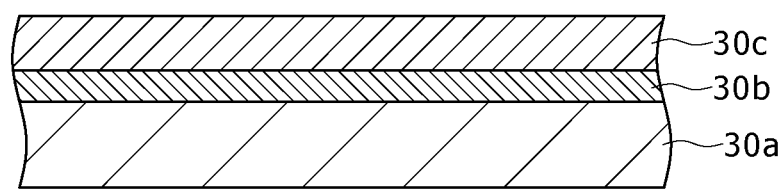
FIG. 3 is a sectional view illustrating an example of a hologram recording medium.

A description will be given here of the hologram recording medium 30 used in the holographic stereogram production system. The same medium 30 is a so-called film-coated recording medium and includes, as illustrated in FIG. 3, a photopolymer layer 30b formed on a film base material 30a. The photopolymer layer 30b includes an optically polymerizing photopolymer. The film base material 30a is formed in a tape form. Further, the photopolymer layer 30b is covered with a cover sheet 30c.

Figure 4A:
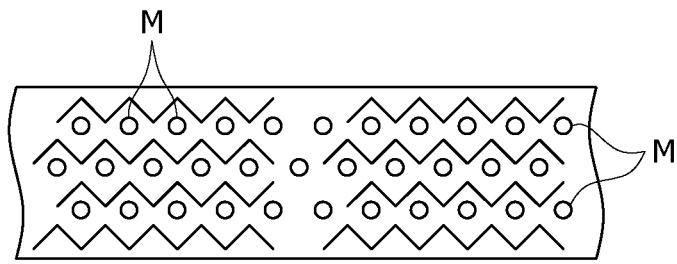
FIGS. 4A to 4C are outlined diagrams illustrating a photosensitizing process of an optically polymerizing photopolymer.
Figure 4B:
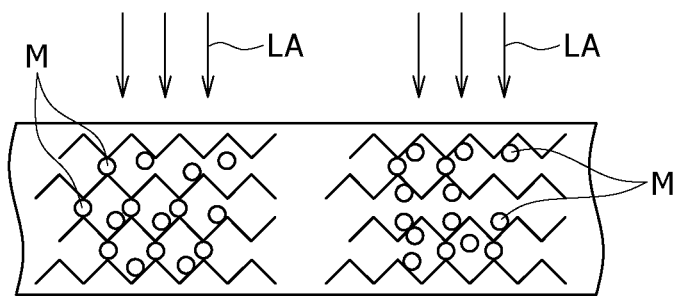
Figure 4C:
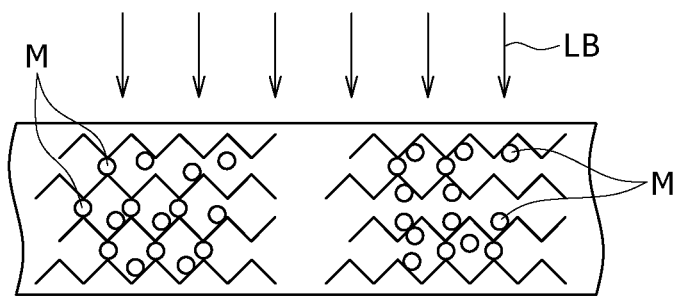

In the initial state of an optically polymerizing photopolymer, monomers M are evenly distributed in a matrix polymer as illustrated in FIG. 4A. In contrast, when the photopolymer is irradiated with a beam LA with a power of about 10 to 400 mJ/cm$^2$, the monomers M polymerize in the portions exposed to the beam LA. As the polymerization progresses, the monomers M migrate, changing the concentration thereof from one place to another and causing refractive index modulation. Then, ultraviolet radiation or a visible beam LB with a power of about 1000 mJ/cm$^2$ is irradiated over the entire surface to complete the polymerization of the monomers M. As described above, the refractive index of an optically polymerizing photopolymer changes according to the incident beam. This makes it possible to record the interference fringes between the reference beam and object beam as a change in refractive index.

The hologram recording medium 30 using such an optically polymerizing photopolymer desires no development after exposure. Therefore, the holographic stereogram printer 3 according to the present embodiment using the hologram recording medium 30 with a photosensitive section made of an optically polymerizing photopolymer provides a simplified configuration. It should be noted that other materials may also be used as a photosensitive material.

"Contact Printing"

Figure 5:
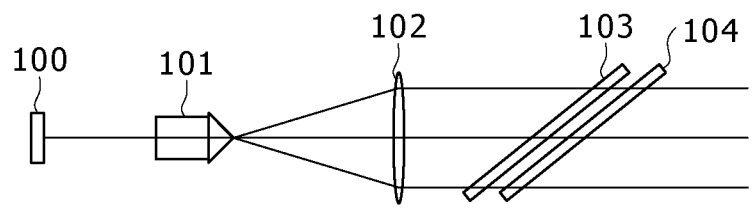
FIG. 5 is an outlined diagram used to describe a contact printer.

In a copying device based on contact printing, a laser beam (S polarization) from a laser beam source 100 is enlarged by a spatial filter 101 and enters a collimation lens 102 as illustrated in FIG. 5. Converted into a parallel beam by the collimation lens 102, the laser beam is irradiated onto a hologram recording medium 103 containing a photosensitive material and a hologram master 104.

The hologram master 104 is a reflection hologram such as volume hologram manufactured as described above and having parallax in the horizontal direction when viewed. The hologram recording medium 103 having a photosensitive material layer and the hologram master 104 are brought into intimate contact with each other either directly or via a refractive index adjustment solution (referred to as an index matching solution). The interference fringes formed by the beam diffracted by the hologram master 104 and the incident laser beam are recorded to the hologram recording medium 103.

As illustrated in FIG. 5, the reference beam incident upon the hologram recording medium 103 is the same as the laser beam (linear polarization) irradiated onto the hologram master 104. This provides maximum sharpness of the interference fringes between the reference beam and the reproduction beam from the hologram master 104. The interference fringes will decline in sharpness if the reference or reproduction beam is polarized. As described later, the embodiment of the present invention intentionally controls the sharpness of the interference fringes recorded to the hologram recording medium 103 according to the characters or other pattern.

<2. Embodiment>

"Multilayer Structure of the Hologram Recording Medium"

A master is produced by the above printer. A hologram recording medium is brought into intimate contact with the master, followed by the irradiation of a laser beam. As a result, the master is copied. The hologram recording medium is an image recording medium and used to make a copy from the master. The hologram recording medium 30 is used as the master. The master may have a hologram photosensitive material between two glass plates rather than having a base material in a film form.

In order to copy the hologram, the hologram recording medium is brought into intimate contact with the master. The hologram is copied before the hologram recording medium is covered with an anti-copying optical functional film which will be described later. In the case of copying for counterfeiting purposes, on the other hand, copying is conducted using the hologram recording medium, which has been copied as described above and is covered with an optical functional film, as the master.

Figure 6:
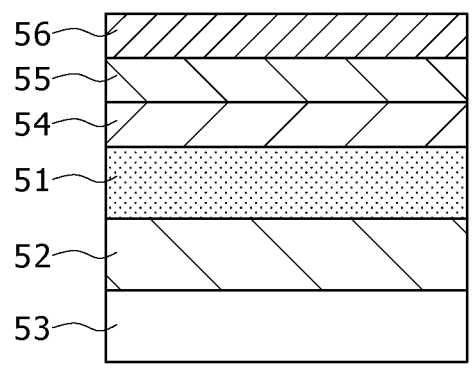
FIG. 6 is an outlined diagram illustrating the configuration of an embodiment of the hologram recording medium according to the present invention.

As illustrated in FIG. 6, the hologram recording medium having an anti-copying function according to an embodiment of the present invention includes a hologram recording layer 51. The same layer 51 is made of a thick hologram photosensitive material having the same thickness as photopolymer and the like. A separator 53 is provided via an adhesive layer (also referred to as a bonding layer) 52 on the side opposite to the viewer side (top in FIG. 6) of the hologram recording layer 51. The separator 53 is a release film made of PET (polyethylene terephthalate) or other resin. The adhesive layer 52 should preferably be black. The reason for this is to prevent the hologram image from being difficult to see if the background is visible through the hologram image when the hologram recording medium is affixed, for example, to merchandise.

The viewer side of the hologram recording layer 51 is covered with an optical functional film 55 via an ultraviolet hardening resin (referred to as a UV (Ultraviolet) resin) layer 54. The same layer 54 is transparent, becomes hardened by the irradiation of ultraviolet ray, and has large peeling strength. The same film 55 is made of a transparent film such as a biaxially stretched PET film or cellophane. The optical functional film 55 is provided for anti-copying purposes. Further, a transparent protective film (referred to as a hard coat as appropriate) 56 is formed on the same film 55. The hard coat 56 is formed, for example, with a UV resin.

The adhesion force of the UV resin layer 54 should preferably be higher than the self-binding force or breaking strength of the hologram recording layer 51. The reason for this is that if an attempt is made to peel off the optical functional film 55 so as to remove the anti-copying function, the hologram recording layer 51 will be damaged, making the same layer 51 no longer reusable.

Figure 7:
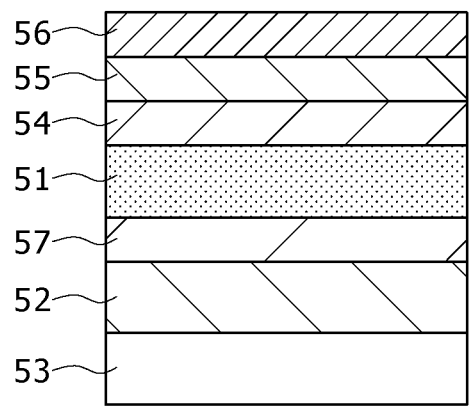
FIG. 7 is an outlined diagram illustrating a modification example of the embodiment of the hologram recording medium according to the present invention.

As illustrated in FIG. 7, a blocking layer 57 may be provided between the hologram recording layer 51 and adhesive layer 52.

The hologram recording layer 51 uses, for example, a photopolymer with a refractive index N of 1.52 as its photosensitive material, thus allowing for the lightness or darkness of the incident beam to be recorded as a difference in refractive index. The properties desired for the hologram recording layer 51 are as follows:

high diffraction efficiency (e.g., 90% or more), half width of diffraction wavelength: 5 to 30 nm, high sensitivity (e.g., 20 mJ/cm$^2$ or less) and low contraction ratio.

The hard coat 56 is provided for damage prevention, static protection, film shape forming and hologram shape stabilization. The properties desired for the hard coat 56 are as follows:

high surface hardness (for damage prevention), low surface resistance, heat resistance (e.g., 100 to 120° C.), low moisture absorbency, excellent adhesiveness and material adhesion, optical refractive index roughly equal to that of a photosensitive material (e.g., 1.52), low birefringence (e.g., ±15 nm (for 633 nm in wavelength)), low haze (haze refers to the extent of unclear clouding of the surface or inside (in appearance)), high transparency, excellent surface smoothness, and possible reduction in film thickness (e.g., 20 μm or less).

The blocking layer 57 in the example shown in FIG. 7 is provided to prevent material permeation and stabilize hologram shape. The same layer 57 is provided because the photosensitive material chemically reacts with the resin film of the separator layer 53. The properties desired for the blocking layer 57 are as follows:

dissolution resistance (immunity to chemical damage by the solution adapted to change the photosensitive material into a liquid form), heat resistance (e.g., 100 to 120° C.), low moisture absorbency, excellent adhesiveness and material adhesion, and possible reduction in film thickness (e.g., 20 μm or less).

The above hologram recording medium is manufactured by forming the respective layers, for example, by means of coating and bonding. In the manufacturing process, the hologram of the hologram master is copied by contact printing, and the optical functional film 55 is affixed after the copying.

"Optical Functional Film"

The term "optical functional film" refers to an optical film having an anti-copying function. The term "optical film" refers to a film adapted to produce optical effects by reflecting or transmitting rays of light. Therefore, the term "optical functional film" may be simply replaced by "film" or "optical film." The optical functional film 55 according to the embodiment is manufactured by biaxially stretching a synthetic resin film while at the same time heating it to a certain extent. That is, the same film 55 is manufactured by drawing the film in the biaxial direction. Stretching provides improved strength and reduced thickness. Further, stretching changes the crystal structure, thus changing the optical properties.

Figure 8:
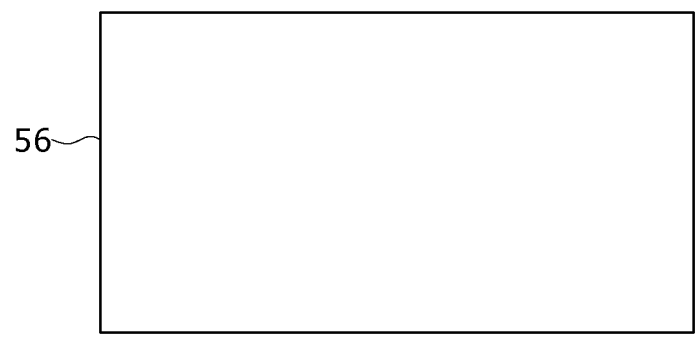
FIG. 8 is an outlined diagram used to describe different sections of the embodiment of the hologram recording medium according to the present invention.
Figure 8:
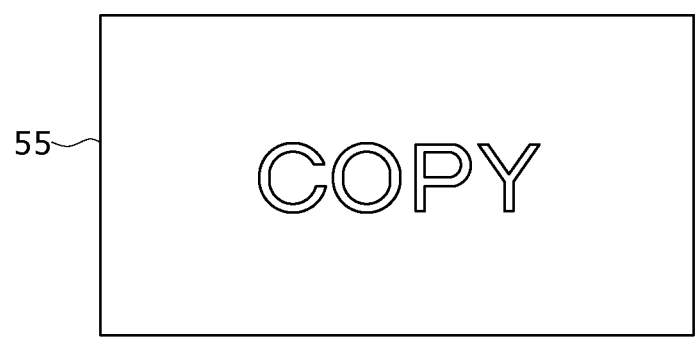
Figure 8:
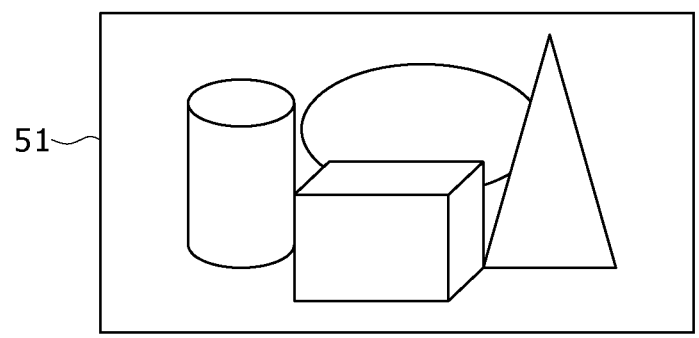

As illustrated in FIG. 8, a hologram is recorded in the hologram recording layer 51. The hologram is illustrated as an image for ease of understanding. In the optical functional film 55, part of the optically anisotropic and transparent (e.g., 90% or more in transmittance) film is hollowed out in advance in the shape of the pattern of characters such as "COPY."

The optical functional film 55 is in intimate contact with the hologram recording layer 51 without the medium of air (via the transparent UV resin layer 54). The optical functional film 55 and UV resin layer 54 are similar in refractive index and transmittance to each other. Besides, there is no air therebetween. Therefore, the characters "COPY" are invisible at first glance. As a result, the characters will not hinder the viewing of the hologram. Further, when the optical functional film 55 is affixed to the UV resin layer 54 in a semi-hardened state, the UV resin will find its way into the hollowed-out portion. The material to be filled into the hollowed-out portion is not limited to the UV resin of the UV resin layer 54. Instead, a material other than the UV resin of the UV resin layer 54 may be used. That is, a material having a color and transmittance almost identical to those of the optical functional film may be filled into the hollowed-out portion.

In general, a material is birefringent when it has different refractive indices for different polarization directions. A birefringent material is called an optically anisotropic material. A non-birefringent material is called an optically isotropic material. Oriented polymer films, liquid crystal polymers, optical crystals and others show birefringence. Glass is an optically isotropic material. The UV resin layer 54 is also low in birefringence and can be said to be an isotropic material. On the other hand, a film whose anisotropy has been improved by stretching (one of oriented polymer films) is used as the optical functional film 55.

As described above, if a hologram is copied by contact printing using a hologram recording medium with the hologram recorded therein as a master, the portion of the optical functional film 55 through which a polarization component contributing to the copying passes will be different from other portion of the same film 55 through which the polarization component does not pass because the same component passes only through the UV resin layer 54. As a result, the interference fringes to be copied differ in sharpness from the original ones. This produces a copied hologram with different brightness depending on different paths. That is, the invisible characters become visible, making it apparent by first glance that the hologram is a copied one.

Figure 9A:
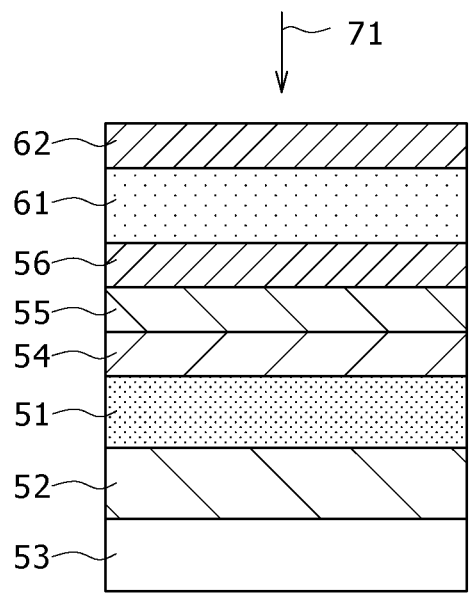
FIGS. 9A and 9B are outlined diagrams used to describe the anti-copying effect of the embodiment of the hologram recording medium according to the present invention.

As illustrated in FIG. 9A, a hologram recording medium for copying purposes is brought into intimate contact with the hologram recording medium according to the embodiment of the present invention on the side closer to the viewer. The hologram recording medium includes a hologram recording layer 61 and transparent base member 62. The transparent base member 62 is formed on the hologram recording layer 61, for example, by coating. With the hologram recording layer 61 in intimate contact with the hard coat 56, a laser beam 71 is irradiated through the base member 62.

Figure 9B:
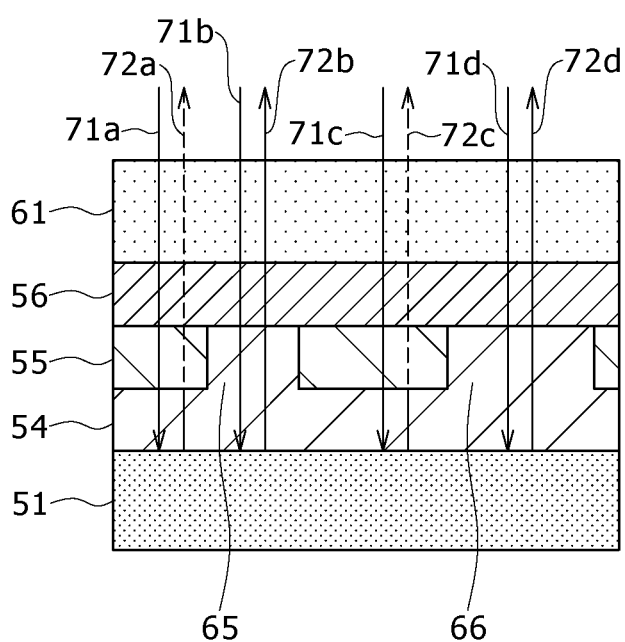

As illustrated in enlarged view in FIG. 9B, an incident laser beam 71a during copying is irradiated onto the hologram recording layer 51 sequentially by way of the hologram recording layer 61, hard coat 56, optical functional film 55 and UV resin layer 54. A reflected laser beam 72a reflected from the hologram recording layer 51 enters the hologram recording layer 61 sequentially by way of the UV resin layer 54, optical functional film 55 and hard coat 56. FIG. 9B is a diagrammatic sketch used for functional description, and the base member 62 is not shown. In this figure, it is assumed that the incident laser beams vertically enter the hologram recording medium for copying purposes, and that their reflected beams leave the same medium from different positions.

In the case of the example of the incident laser beam 71a, a phase difference occurs due to birefringence as a result of the same beam 71a passing through the optical functional film 55. This phase difference leads to decline in sharpness of the interference fringes between the reference and reproduction beams, thus darkening the image copied by the same laser beam 71a. For example, if the optical functional film 55 has a function close to that of a quarter-wave plate for the incident laser beam, the polarization rotates 90 degrees because the laser beams 71a and 72a each pass through the optical functional film 55 once, i.e., twice in total. This results in lower coherence. On the other hand, the laser beams 71b and 72b pass through the UV resin layer 54 but not the optical functional film 55. Therefore, birefringence occurs to a small extent. As a result, the polarization plane of the laser beams remains unchanged. All components contribute to the recording of the interference fringes, thus providing high sharpness of such fringes. As a result, the image copied by the laser beams 71b and 72b will not be dark. Similarly, an incident laser beam 71c and a reflected laser beam 72c pass through the optical functional film 55. As a result, the interference fringes will decline in sharpness. Further, an incident laser beam 71d and a reflected laser beam 72d do not pass through the optical functional film 55. As a result, the interference fringes are high in sharpness. The film can be disposed so as to achieve the lowest coherence at the ideal incidence angle of the reference beam onto the hologram by controlling the orientation of the optical axis of birefringence.

As described above, if a hologram is copied using the hologram recording medium according to the embodiment of the present invention as a master, the pattern formed in the optical functional film 55 will appear in the copied hologram. This makes it apparent by first glance that the hologram is a copied one, thus ensuring enhanced security in authentication. This has an advantageous effect in that the pattern appears like a watermark if copied. Further, it is possible to make the above pattern or characters invisible under natural light visible by using a polarizer in combination.

The pattern to be cut out in the optical functional film 55 need not necessarily be characters such as "COPY" but may be other pattern. Further, micro characters or a pattern may be recorded by means of laser machining, electrical discharge machining or electron beam machining. Further, personal information such as individual ID, personal face picture and fingerprint may be recorded.

As a specific example of the optical functional film 55, a phase difference plate such as half-wave plate or quarter-wave plate, or a film such as phase difference film which allows the phase difference to be controlled can be used. Ideally, it is effective to use a phase difference plate adapted to produce a phase difference close to one quarter the wavelength of the laser beam to be recorded. However, the present invention is not limited thereto. Further, the optical functional film 55 need not necessarily be a phase difference film. Because it is only necessary to produce a phase difference, a film having large birefringence may be used. An inexpensive film made of cellophane, stretched PET or other material may be used.

Further, it is not necessary to completely cut out the film for patterning. This function of a phase difference plate can be provided by so-called nano-imprinting which forms a microstructure at a high aspect ratio. Nano-imprinting is designed to transfer the pattern by pressing the projections and depressions from several tens to several hundreds of nm engraved in a mold against a resin material on the substrate. As an example, a microstructure sized to match, for example, the wavelength of the laser beam is formed in a transparent base material by nano-imprinting. Further, a material can be used which has been patterned by partially changing the microstructure in the in-plane orthogonal direction. In this case, the pattern itself was invisible by visual inspection from the surface, but visible when viewed with a cross Nicole polarizer. Further, micro characters may be engraved by nano-imprinting. Still further, a film may be used whose level of anisotropy has been changed by stamping an anisotropic oriented polymer film while at the same time partially heating it.

The film is more effective against illegal copying if the orientation of the optical axis is different in addition to the patterning of the optically anisotropic and non-optically anisotropic portions. For example, if the film is patterned so that the optical axis is oriented in the in-plane orthogonal direction, the latent image becomes apparent at the time of illegal copying irrespective of the direction in which the film is oriented.

Still further, the optical functional film may be a polarizer because a difference arises between s and p polarization components contributing to hologram recording. Partially forming a linear polarizer alone makes evident the distinction between dark and bright areas when illuminated with natural light due to the presence or absence of the polarizer function. However, what is not perceivable under natural light can be made perceivable under laser beam and what is copyable can be made non-copyable by partially changing the absorption axis of the polarizer.

Still further, the polarizer may be formed with nano-imprinted wire grid. That is, a polarizer can be used which has a high-aspect-ratio structure formed by means of vapor deposition.

As described above, an original hologram can be copied by contact printing in which an unexposed volume hologram recording medium is placed over a volume hologram master, followed by the irradiation of an approximately parallel beam. Here, if an optical functional film having the above-described function of a phase difference plate and polarizer is provided between the master and unexposed material, even the pattern will be copied. The laser beam contributing to the copying of a hologram is patterned although the extent of patterning varies depending on the s or p polarization.

A hologram used for authentication purposes should not be illegally copied. Therefore, it is meaningful to ensure that no hologram identical to the master can be produced by forming the above-described pattern.

It should be noted that the adhesion force between the optical functional film and hologram recording material is greater than the self-binding force of the hologram recording layer. Therefore, if an attempt is made to peel off the optical functional film, the hologram itself fractures due to brittleness before the optical functional film and recording material peel off. As a result, an attempt to peel off the patterned film for illegal copying leads to fracture of the hologram itself.

<3. Modification Example>

Although the anti-copying hologram according to the present invention has been described above based on several embodiments, the present invention is not limited to these embodiments but may be modified in various ways. For example, an isotropic film may be used as an optical functional film. The isotropic film may be partially hollowed out, and the hollowed-out portion may be filled with an anisotropic material. Further, a case was described in which the optical functional film was formed on the side closer to the viewer than the hologram forming layer. However, the optical functional film may be formed on the side more rearward than (on the opposite side of) the hologram forming layer. In this case, the optical functional film does not serve its purpose against the image diffracted by the hologram forming layer. Practically, however, if a beam successfully reaches the unexposed recording material after transmitting through the optical functional film and being reflected by the hologram back surface, there will be a difference in its polarization components contributing to hologram recording. Because the pattern regularly reflected by the hologram back surface is copied, the illegally copied hologram will be different from the original one.

The present application contains subject matter related to that disclosed in Japanese Priority Patent Application JP 2009-267209 filed in the Japan Patent Office on Nov. 25, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A volume hologram recording medium, comprising:
a hologram recording layer with a hologram recorded therein;
an optical functional film on a side of the hologram recording layer from which the hologram is viewed; and
a layer between the hologram recording layer and the optical functional film and securing the hologram recording film and the optical functional film together;
wherein,
the optical functional film is a biaxially stretched polymer film with at least a partial pattern therein, and
at least a portion of the optical functional film is optically anisotropic.

2. The hologram recording medium of claim 1, wherein the optically anisotropic portion is patterned so that the direction of the optical axis thereof is different than that of the hologram recording layer.

3. The hologram recording medium of claim 1, wherein the optically anisotropic portion is partially hollowed out, and
an isotropic material approximately identical in appearance to the optical functional film is filled into the hollowed-out portion.

4. The hologram recording medium of claim 1, wherein the optical functional film is a phase difference film.

5. The hologram recording medium of claim 1, wherein the optical functional film is a polarizing film.

6. The hologram recording medium of claim 1, wherein the optical functional film has a microstructure formed by nano-imprinting.

7. The hologram recording medium of claim 1, wherein the optical functional film has a microstructure patterned by nano-imprinting.

8. The hologram recording medium of claim 1, wherein the adhesion force between the optical functional film and hologram recording layer is greater than the self-binding force of the hologram recording layer.

9. The volume hologram recording medium of claim 1, wherein the optical functional film and the layer securing the optical functional film to the hologram recording layer have the same refractive index.

10. The hologram recording medium of claim 1, wherein the optical functional film is an optically isotropic film.

11. The hologram recording medium of claim 10, wherein the optically isotropic film is partially hollowed out, and
an anisotropic material approximately identical in appearance to the film is filled into the hollowed-out portion.

* * * * *